United States Patent [19]

Yahagi

[11] Patent Number: 5,613,199
[45] Date of Patent: Mar. 18, 1997

[54] MOBILE COMMUNICATION SYSTEM AND A MOBILE STATION PAGING METHOD

[75] Inventor: Masahiko Yahagi, Tokyo, Japan

[73] Assignee: NEC Corporation, Tokyo, Japan

[21] Appl. No.: 453,895

[22] Filed: May 30, 1995

[30] Foreign Application Priority Data

May 30, 1994 [JP] Japan .................................. 6-116946

[51] Int. Cl.$^6$ ...................................................... H04Q 7/00
[52] U.S. Cl. ........................ 455/33.1; 455/56.1; 455/38.1
[58] Field of Search .................................. 455/33.1, 38.1, 455/51.1, 54.1, 56.1; 340/825.44, 825.49; 379/57, 58, 59, 60, 63

[56] References Cited

U.S. PATENT DOCUMENTS

| | | | |
|---|---|---|---|
| 5,305,466 | 4/1994 | Taketsugu | 455/33.1 |
| 5,369,681 | 10/1994 | Boudreau et al. | 455/33.1 |
| 5,379,451 | 1/1995 | Nakagoshi et al. | 455/33.1 |
| 5,539,923 | 7/1996 | Matsumoto | 455/33.1 |

FOREIGN PATENT DOCUMENTS 6-116946  5/1994  Japan .

OTHER PUBLICATIONS

"Public Land Mobile Network Interworking with ISDN and PSTN: CCITT Recommendations Q.1001 to Q.1032", *Fascicle*, VI.12, pp. 5–16.

*Primary Examiner*—Reinhard J. Eisenzopf
*Assistant Examiner*—Marsha D. Banks-Harold
*Attorney, Agent, or Firm*—Young & Thompson

[57] ABSTRACT

A mobile communication system and a mobile station paging method are provided which are capable of sending a mobile station paging signal only to base station areas in which a mobile station to be paged for an incoming call might be present. The mobile communication system is provided with a location register 31, a mobile station paging signal transfer node 21 and base stations 11 to 13. The mobile station paging signal transfer node 21 receives a mobile station paging signal from the location register 31 which has identified the location area for paging a mobile station for an incoming call, and the mobile station paging signal transfer node 21 searches sublocation information to identify certain base stations to receive the mobile station paging signal. The sublocation information contains a number of mobile stations existing in a base station area classified into eight group numbers, and the group number for a mobile station to be paged is calculated based on the mobile station identification number which has been sent from the location register 31 together with the mobile station paging signal. The sublocation information is searched by an index key of the calculated group number for a mobile station to be paged, and if at least one mobile station is found in the corresponding group number, the mobile station paging signal is sent to this base station. The mobile station paging signal transfer node 21 repeats this procedure for all base stations 11 to 13 under its control.

6 Claims, 11 Drawing Sheets

| Mobile Station Number | Mobile Station Group Number |
|---|---|
| 7759 | 8 |
| 1032 | 1 |
| 4871 | 8 |
| 2624 | 1 |
| 7892 | 5 |
| 8733 | 6 |
| 9371 | 4 |
| 7084 | 5 |

FIG. 4

| | |
|---|---|
| 2 | ← Number of mobile stations in group 1 |
| 0 | ← Number of mobile stations in group 2 |
| 0 | |
| 1 | |
| 2 | |
| 1 | |
| 0 | ← Number of mobile stations in group 7 |
| 2 | ← Number of mobile stations in group 8 |

For base station 11;(1)

| | |
|---|---|
| 2 | ← Number of mobile stations in group 1 |
| 0 | ← Number of mobile stations in group 2 |
| 0 | |
| 1 | |
| 2 | |
| 1 | |
| 0 | ← Number of mobile stations in group 7 |
| 2 | ← Number of mobile stations in group 8 |

FIG. 6A

For base station 12;(2)

| | |
|---|---|
| 1 | ← Number of mobile stations in group 1 |
| 0 | ← Number of mobile stations in group 2 |
| 1 | |
| 0 | |
| 4 | |
| 1 | |
| 1 | ← Number of mobile stations in group 7 |
| 0 | ← Number of mobile stations in group 8 |

FIG. 6B

For base station 13;(3)

| | |
|---|---|
| 1 | ← Number of mobile stations in group 1 |
| 2 | ← Number of mobile stations in group 2 |
| 0 | |
| 0 | |
| 0 | |
| 3 | |
| 1 | ← Number of mobile stations in group 7 |
| 1 | ← Number of mobile stations in group 8 |

| Node number | Group number | Number of M station | Node number | Group number | Number of M station | Node number | Group number | Number of M station |
|---|---|---|---|---|---|---|---|---|
| 221 | 1 | 1 | 222 | 1 | 2 | 223 | 1 | 1 |
| 221 | 2 | 0 | 222 | 2 | 1 | 223 | 2 | 2 |
| 221 | 3 | 0 | 222 | 3 | 0 | 223 | 3 | 1 |
| 221 | 4 | 0 | 222 | 4 | 0 | 223 | 4 | 0 |
| 221 | 5 | 2 | 222 | 5 | 0 | 223 | 5 | 1 |
| 221 | 6 | 1 | 222 | 6 | 1 | 223 | 6 | 0 |
| 221 | 7 | 0 | 222 | 7 | 0 | 223 | 7 | 3 |
| 221 | 8 | 2 | 222 | 8 | 1 | 223 | 8 | 2 |
| 221 | 9 | 2 | 222 | 9 | 1 | 223 | 9 | 0 |
| 221 | 10 | 2 | 222 | 10 | 1 | 223 | 10 | 0 |
| 221 | 11 | 1 | 222 | 11 | 1 | 223 | 11 | 1 |
| 221 | 12 | 1 | 222 | 12 | 2 | 223 | 12 | 1 |
| 221 | 13 | 1 | 222 | 13 | 1 | 223 | 13 | 0 |
| 221 | 14 | 3 | 222 | 14 | 2 | 223 | 14 | 0 |
| 221 | 15 | 0 | 222 | 15 | 0 | 223 | 15 | 2 |
| 221 | 16 | 0 | 222 | 16 | 0 | 223 | 16 | 0 |
| 221 | 17 | 1 | 222 | 17 | 3 | 223 | 17 | 0 |
| 221 | 18 | 0 | 222 | 18 | 3 | 223 | 18 | 1 |
| 221 | 19 | 0 | 222 | 19 | 2 | 223 | 19 | 2 |
| 221 | 20 | 0 | 222 | 20 | 1 | 223 | 20 | 2 |
| 221 | 21 | 3 | 222 | 21 | 1 | 223 | 21 | 0 |
| 221 | 22 | 1 | 222 | 22 | 0 | 223 | 22 | 0 |
| 221 | 23 | 2 | 222 | 23 | 0 | 223 | 23 | 3 |
| 221 | 24 | 1 | 222 | 24 | 1 | 223 | 24 | 2 |

FIG. 11A

Node 221
base station 111

| Group number | Number of Mobile Station |
|---|---|
| 1 | 3 |
| 2 | 0 |
| 3 | 0 |
| 4 | 1 |
| 5 | 2 |
| 6 | 2 |
| 7 | 0 |
| 8 | 2 | base station 112

| Group number | Number of Mobile Station |
|---|---|
| 1 | 0 |
| 2 | 2 |
| 3 | 0 |
| 4 | 0 |
| 5 | 1 |
| 6 | 1 |
| 7 | 1 |
| 8 | 0 | base station 113

| Group number | Number of Mobile Station |
|---|---|
| 1 | 1 |
| 2 | 0 |
| 3 | 1 |
| 4 | 0 |
| 5 | 3 |
| 6 | 2 |
| 7 | 1 |
| 8 | 1 |

FIG. 11B

Node 222
base station 121

| Group number | Number of Mobile Station |
|---|---|
| 1 | 3 |
| 2 | 1 |
| 3 | 0 |
| 4 | 1 |
| 5 | 0 |
| 6 | 3 |
| 7 | 0 |
| 8 | 1 | base station 122

| Group number | Number of Mobile Station |
|---|---|
| 1 | 0 |
| 2 | 2 |
| 3 | 1 |
| 4 | 1 |
| 5 | 1 |
| 6 | 0 |
| 7 | 0 |
| 8 | 0 | base station 123

| Group number | Number of Mobile Station |
|---|---|
| 1 | 3 |
| 2 | 2 |
| 3 | 2 |
| 4 | 1 |
| 5 | 1 |
| 6 | 0 |
| 7 | 0 |
| 8 | 1 |

FIG. 11C

Node 223
base station 131

| Group number | Number of Mobile Station |
|---|---|
| 1 | 1 |
| 2 | 1 |
| 3 | 1 |
| 4 | 1 |
| 5 | 1 |
| 6 | 0 |
| 7 | 3 |
| 8 | 1 | base station 132

| Group number | Number of Mobile Station |
|---|---|
| 1 | 0 |
| 2 | 1 |
| 3 | 1 |
| 4 | 0 |
| 5 | 0 |
| 6 | 0 |
| 7 | 2 |
| 8 | 1 | base station 133

| Group number | Number of Mobile Station |
|---|---|
| 1 | 0 |
| 2 | 1 |
| 3 | 2 |
| 4 | 2 |
| 5 | 0 |
| 6 | 0 |
| 7 | 3 |
| 8 | 2 |

MOBILE COMMUNICATION SYSTEM AND A MOBILE STATION PAGING METHOD

BACKGROUND OF THE INVENTION

1. Field of the Invention

The present invention relates to a mobile communication system and a mobile station paging method, and more particularly, to a mobile communication system which comprises a plurality of base stations for paging a mobile station at which an incoming call is to be received, a location register for storing location information from a plurality of mobile stations, a mobile station paging signal transfer node interconnecting those base stations and the location register by physical or logical means; and to a mobile station paging method for sending a mobile station paging signal selectively to particular base stations in a location area where a mobile station to be paged is expected to be present.

2. Description of Related Art

A mobile station paging signal (hereafter referred to as a paging signal) is broadcast from a base station prior to establishing a communication link for an incoming call with a particular mobile station in a mobile communication system. If the mobile station at which the incoming call is to be received is present in a base station area covered by the radio signal of the base station, and if the mobile station is available to accept the incoming call, the mobile station responds to the paging signal. This is the basic procedure for identifying a mobile station with which a communication link is to be established.

A conventional paging method for a mobile station in a mobile communication system is described in "Public Land Mobile Network Interworking with ISDN and PSTN: CCITT Recommendations Q.1001 to Q.1032", *Fascicle*, VI.12, pps 5–16.

As described in this reference, the service area of a mobile communication system for mobile communication services consists of one or more location areas, and each location area consists of one or more base station areas. The base station area is defined as an area covered by the radio signal of one base station, and the location area is defined as that area in which a mobile station may move freely without updating its location information. The location information is used for identifying a location area in which a mobile station exists at present, and it is stored in a location register.

Therefore, when an incoming call is being sent to a mobile station, the location area where the mobile station is at that time is identified by the location information in the location register, and all base stations in the location area are instructed to broadcast a paging signal to locate the desired mobile station.

Figure 1:
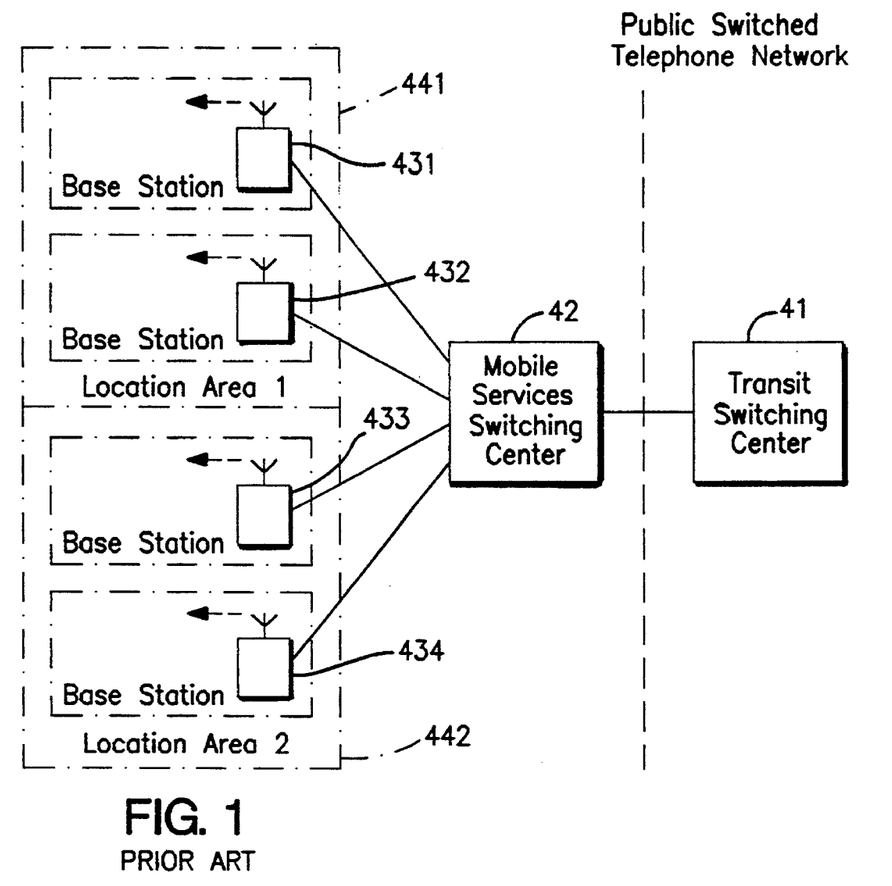
FIG. 1 is a schematic block diagram illustrating a conventional mobile communication system and the associated mobile station paging method.

FIG. 1 is a block diagram showing the conventional mobile station paging method illustrated in the above-mentioned reference.

A mobile services switching center (MSC) 42 is connected to a transit switching center 41 for call connection with a public switched telephone network (PSTN), and to base stations 431 to 434 for connection with mobile stations (not shown) by radio signal. The area controlled by the MSC 42 is called a controlled area or an MSC area, and this MSC area consists of two location areas, the location area 1 and the location area 2 as an example in FIG. 1. In this example, each location area consists of base station areas covered by base stations 431, 432 and base stations 433, 434, respectively.

As the location area is that area in which a mobile station may move freely without updating its location information, once it has moved to the other location area, the mobile station should report its change to a database managed by the location register (not shown) and update the location information to a new location area which has been notified by a location signal including a location area identifier broadcast from a base station in that other location area to which the mobile station has moved.

Since the location of each mobile station is identified by location information which is the same for all mobile stations in a given location area, the location area also broadcasts a paging signal when a call is being sent to a mobile station present in that location area, and all base stations present in that location area are instructed to re-broadcast the paging signal even though the mobile station to be paged exists in only one base station area and not in the other base station areas.

For example, in FIG. 1, assume that an incoming call from the PSTN is being sent to a mobile station (not shown) in the base station area covered by base station 431 in location area 1. At this time, the MSC 42 accesses the database managed by the location register (not shown) to query the location information of the mobile station to which the call is being sent. The MSC 42 recognizes that the mobile station to be paged is present in location area 1 by the response of the database, and the MSC 42 then instructs all base stations in the location area 1, i.e., base stations 431 and 432, to broadcast the paging signal even though the mobile station to be paged is in only the base station area covered by base station 431. That is, regardless of which base station area the mobile station to be paged is in, the MSC 42 always instructs broadcasting of the paging signal to all base stations in the location area, which is the only information by which the MSC 42 can identify the location of the mobile station. Once the mobile station responds to the paging signal, the answer signal is received by the base station 431 and transferred to the MSC 42, and at this time, the MSC 42 can identify the particular base station area in which the mobile station exists.

In this conventional mobile station paging method, the number of paging signals broadcast into a location area is equal to the number of incoming calls to the mobile station within the location area, and is also equal to the number of paging signals broadcast by each base station in the location area. This is because the MSC 42 instructs all base stations in the location area to broadcast the paging signal. This means that the number of paging signals broadcast by a given base station is greater than the number of incoming calls to the mobile stations in the base station area which can be covered by the radio signal of any one base station, and also that each base station must broadcast paging signals for mobile stations not only in its own base station area but also in other base station areas in the same location area.

Thus, there is a problem that each base station has to broadcast additional paging signals for mobile stations not within its own base station area, and, as the number of base stations in a given location area increases, the number of signals to be transferred between the MSC 42 and each base station, and between each base station and the mobile station, is correspondingly increased. This in turn increases the signal processing load in the MSC 42 and in each base station, and also gives rise to the need for a transmission medium with high paging channel capacity.

Alternatively, it is possible to reduce the number of paging signals to be broadcast by reducing the number of base stations in a location area. In this case, however, there is a problem that the number of times of entering and leaving a given location area are increased because the location area is also reduced by reducing the number of base stations, so that the location information has to be updated frequently in the location register, and it causes an increased processing load at the location register.

SUMMARY OF THE INVENTION

The present invention solves the above problems, by providing a mobile communication system and a mobile station paging method which are capable of sending a paging signal to only those base station areas in which the presence of a mobile station to be paged for an incoming call is expected.

To do this, the mobile communication system according to the present invention comprises a plurality of base stations for communicating with a plurality of mobile stations in a corresponding plurality of base station areas which are identified by a location signal including a sublocation area identifier broadcast from each of the base stations, a location register for supplying as paging signal with a mobile station identification number when an incoming call is being sent to a mobile station in one of a plurality of location areas, and a mobile station paging signal transfer node interconnecting the base stations and the location register.

The mobile station paging signal transfer node comprises a receiving means for receiving a paging signal supplied from the location register and for analyzing a mobile station identification number supplied with the signal, a sublocation information register which indicates correspondences between a number of mobile stations existing in each base station area and a group number classified into predetermined groups based on a mobile station identification number, identification means for identifying one or more base stations in which a mobile station to be paged is expected to be present by searching the sublocation information for each base station, and a transferring means for transferring a paging signal to one or more base stations identified by the identification means.

The identification means also comprises converting means for converting a mobile station identification number into a group number used in the sublocation information register.

The identification means further comprises judging means for judging whether a mobile station to be paged might be present in a given base station area by finding a plurality of mobile stations indicated by a group number of the sublocation information which coincides with a group number obtained by the convening means.

The mobile station paging method according to the present invention comprises the steps of receiving a paging signal supplied from the location register for analyzing a mobile station identification number supplied with the signal, convening the mobile station identification number into one of a predetermined number of groups, searching the sublocation information for each base station with an index key of the converted group number, judging whether a mobile station to be paged might be present in a given base station area by finding a plurality of mobile stations indicated by a group number of the sublocation information which coincides with the index key of the convened group number, identifying one or more base stations in which a mobile station to be paged is expected to be present as a result of the judging, and transferring a paging signal to the one or more identified base stations.

The mobile communication system according to the present invention may also have a hierarchical structure using a plurality of mobile station paging signal transfer nodes instead of providing only one node. Each node comprises receiving means for receiving a paging signal supplied from a mobile station paging signal transfer node in the next higher level of the hierarchy, and for analyzing a mobile station identification number supplied with the signal, a sublocation information register which indicates correspondences between a number of mobile stations existing in each base station area connected through a plurality of lower level mobile station paging signal transfer nodes and a group number classified into a predetermined number of groups each of which is converted from a mobile station identification number, identification means for identifying one or more mobile station paging signal transfer nodes belonging to a lower level of the hierarchy, through which a base station expected to contain a targeted mobile station to be paged is connected, by searching the sublocation information for each lower level hierarchy mobile station paging signal transfer nodes, and transferring means for transferring a paging signal to one or more of the next lower level mobile station paging signal transfer nodes identified by the identification means.

A more complete understanding of the present invention and many of its attendant advantages will be more readily attained from the following detailed description when considered in connection with the accompanying figures.

DETAILED DESCRIPTION OF PREFERRED EMBODIMENTS

Figure 2A:
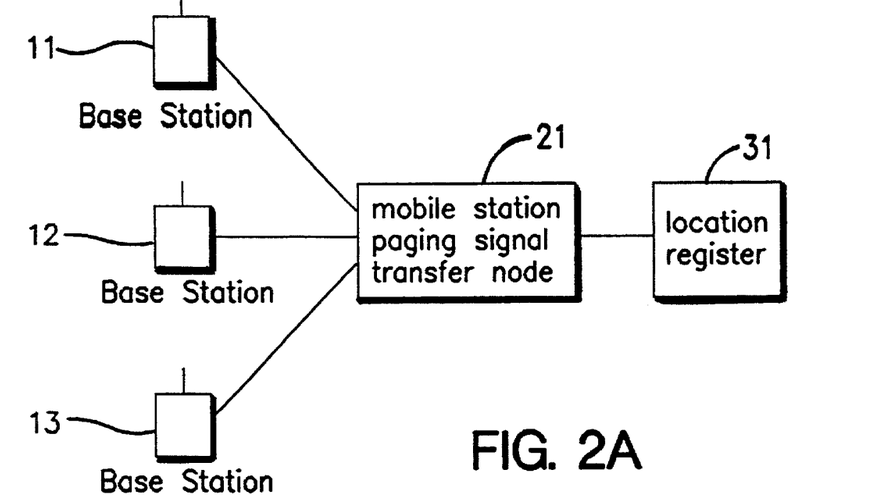
FIGS. 2(a) and 2(b) are schematic block diagrams illustrating a mobile communication system according to a first embodiment of the present invention.
Figure 2B:
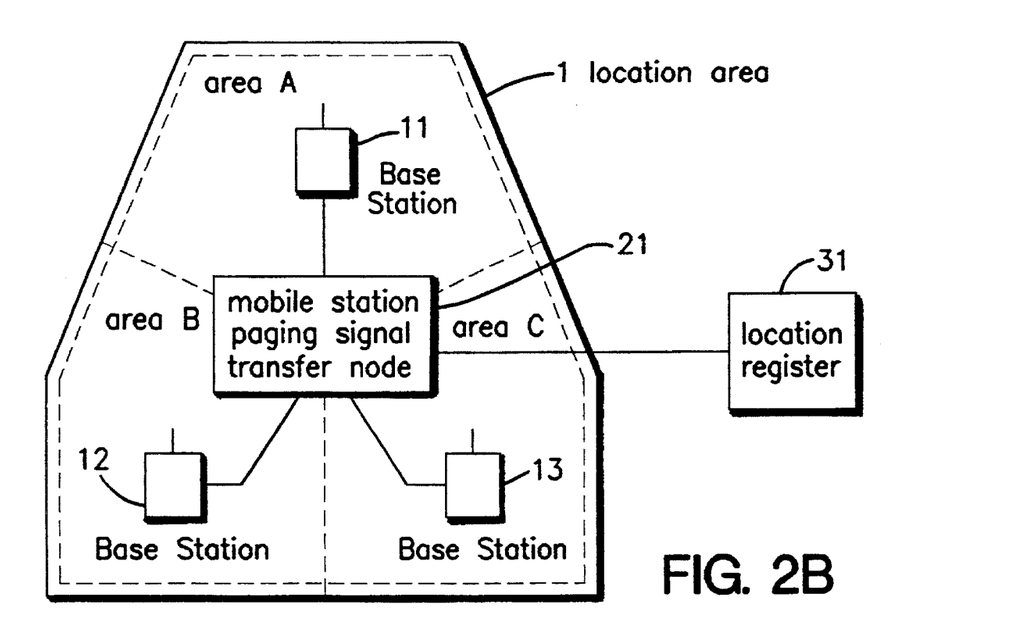

FIG. 2(a) shows one location area in which base stations 11 to are connected to a mobile station paging signal transfer node (hereafter referred to as a signal transfer node) 21, and the signal transfer node 21 is connected to a location register 31 which manages location information for all mobile stations in this mobile communication system. FIG. 2(b) shows the same mobile communication system from an area point of view, i.e. the location area 1 (enclosed with a solid line) consists of three base station areas (enclosed with dotted lines), area A, area B and area C, and each area is covered by the radio signal of its corresponding base station 11, 12 or 13. The signal transfer node 21 is located in the location area 1 and controls the paging signal transfer to each base station. The location register 31 is connected to the signal transfer node 21. The location register is also connected to other signal transfer nodes (not shown) for other location areas making up the mobile communication service area of a mobile communication system.

When there is an incoming call to a particular mobile station (not shown) in location area 1 of FIG. 2(b), in sending the call, the location register 31 determines by location information stored therein that the mobile station to be paged is present in the location area 1 which is controlled by the signal transfer node 21, and then sends out a paging signal which includes a mobile station identification number to the signal transfer node 21. The signal transfer node 21 identifies a base station area (or base station areas) in which a mobile station to be paged is expected to be present by searching sublocation information, which will be described later, stored therein with an index key converted from the mobile station identification number sent with the paging signal, and it transfers the paging signal with a mobile station identification number to that base station (or base stations) which covers the identified base station area (or base station areas) to instruct broadcasting of the paging signal.

Figure 3:
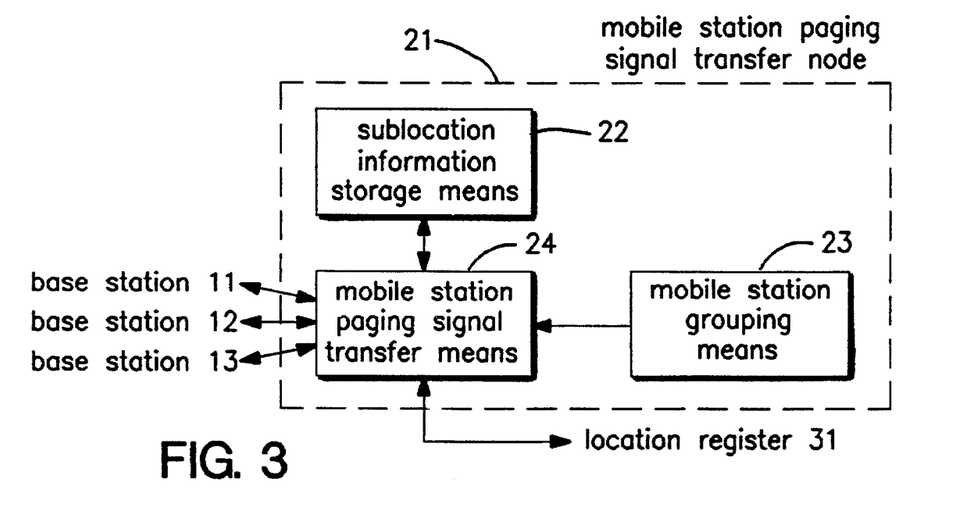
FIG. 3 is a schematic block diagram illustrating the mobile station paging signal transfer node 21 shown in FIGS. 2(a) and 2(b)

FIG. 3 is a block diagram showing a configuration of the signal transfer node 21 of FIGS. 2(a) and 2(b). The signal transfer node 21 consists of: a mobile station paging signal transfer means 24 which is a means for controlling several operations of this node such as receiving the paging signal from the location register 31, searching sublocation information, identifying that abase station (or base stations) to which the paging signal is to be transferred, etc.; a sublocation information storage means 22 which stores sublocation information, and a mobile station grouping means 23 which converts a mobile station identification number to a group number, which will also be described later, for use in sublocation information.

Sublocation information is used for identifying that base station area in which the mobile station to be paged is expected to be present. As the location register can identify a location area in which the mobile station to be paged exists but it cannot identify each base station area, a sublocation area and sublocation information are used in the present invention.

A sublocation area essentially corresponds to a base station area, and each base station broadcasts different location signals including a sublocation area identifier to notify its own base station area (or sublocation area) even if they belong to the same location area. Therefore, a mobile station can recognize a change in base station area while the mobile station is moving through different base station areas even in the same location area.

When the mobile station recognizes that it has moved into a different area, it sends a report of the location registration, which includes information relating to a previous sublocation area in which the mobile station was present, through a base station of the area into which the mobile station has newly entered. This report is transferred to the signal transfer node which controls the base station in that location area, and the report of location registration from the mobile station is analyzed.

If the location registration relates to a change of location area, the signal transfer node transfers this location registration to the location register for updating location information stored in the location register as well as updating sublocation information stored in the signal transfer node. However, if the location registration relates only to changing sublocation area, the signal transfer node does not transfer the location registration to the location register and only updates sublocation information stored in the signal transfer node. This is because the location area information does not change.

Sublocation information is the information stored and managed in the signal transfer node for each base station controlled by the signal transfer node.

The sublocation information for each base station contains group numbers and the number of mobile stations currently present in the associated base station area.

As each mobile station has its own mobile station identification number, this mobile station identification number is grouped among several groups. In this embodiment, the mobile station identification number is grouped in eight groups. This is because calculation for grouping is easily performed in a binary manner.

Figure 4:
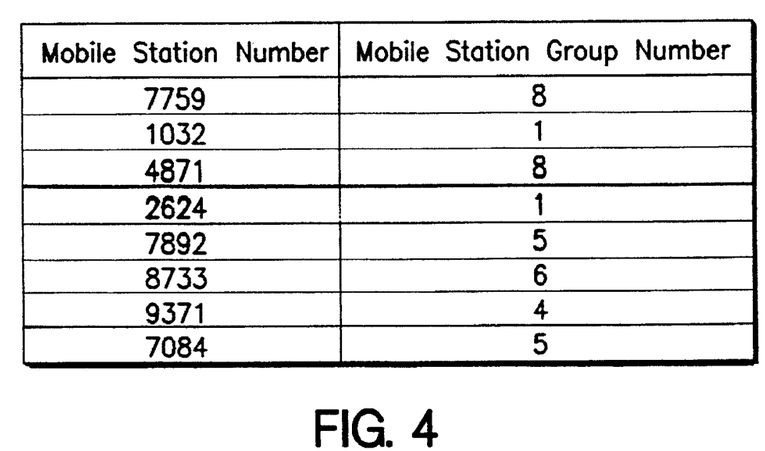
FIG. 4 is a table showing an example of how the group number is converted from the mobile station identification number.

In particular, each mobile station identification number is divided by eight, any remainder is dropped, the resultant integer is multiplied by eight, and the difference between this figure and the identification number is increased by one. A figure obtained becomes a group number of the mobile station. FIG. 4 is a table showing examples of mobile station identification numbers and each of corresponding group number calculated by this algorithm. For example, 7759 divided by 8 is 969.875; 969 times 8 is 7752; and 7759 minus 7752 plus 1 is 8.

Although it is possible to store and manage the sublocation information on the basis of each mobile station identification number, with very precise control in identifying the base station area for instructing a paging signal broadcasting, this is not practical because a large memory capacity would be needed for storing information from an unexpectedly large number of mobile stations. On the contrary, it is possible to minimize the necessary memory capacity by the method of converting each mobile station identification number to a group number, even if the number of mobile stations to be managed is unexpectedly high.

This calculation is carried out for all mobile station identification numbers for mobile stations existing in the base station area and those results are sorted according to group numbers, i.e. the number of mobile stations having the same group number is accumulated under each group number and as the result, a total number of mobile stations for each group number is known.

This calculation is carried out by the mobile station grouping means 23 of FIG. 3 when a mobile station reports a location registration, and the result is updated and stored in the sublocation information storage means 22 under the control of mobile station paging signal transfer means 24 in FIG. 3.

Figure 5:
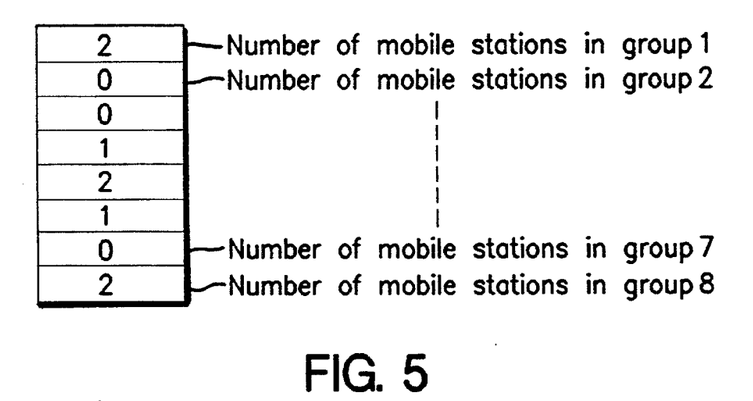
FIG. 5 is a schematic diagram showing an example of the sublocation information for one base station.
Figure 6A:
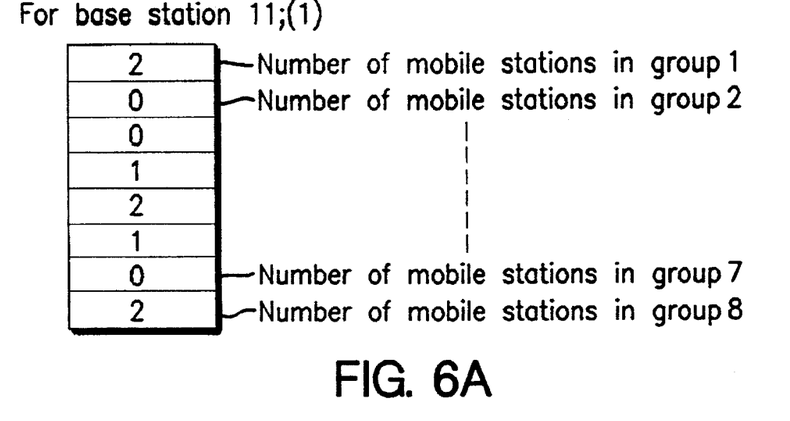
FIGS. 6A–6B are schematic diagrams showing examples of the sublocation information as stored in a signal transfer node.
Figure 6B:
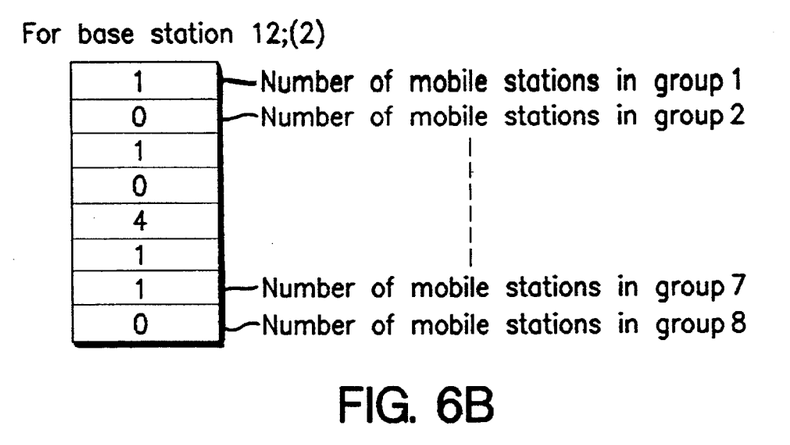
Figure 6C:
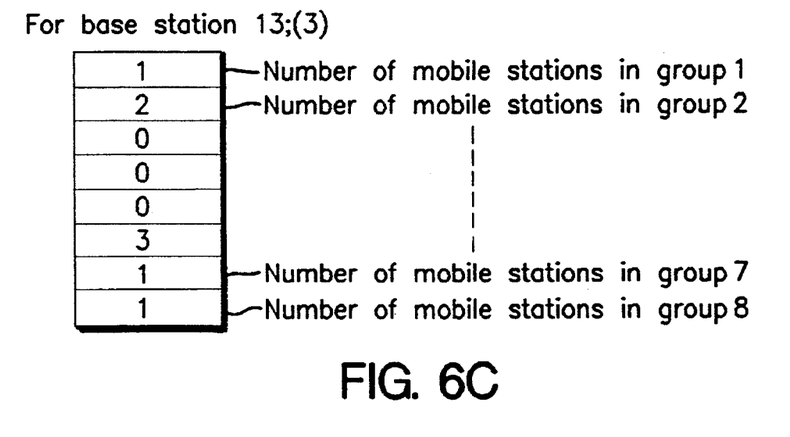

FIG. 5 shows an example of the sublocation information for one of base station areas, and FIGS. 6A–6C are the sublocation information for all base stations under control of the signal transfer node 21.

Figure 7:
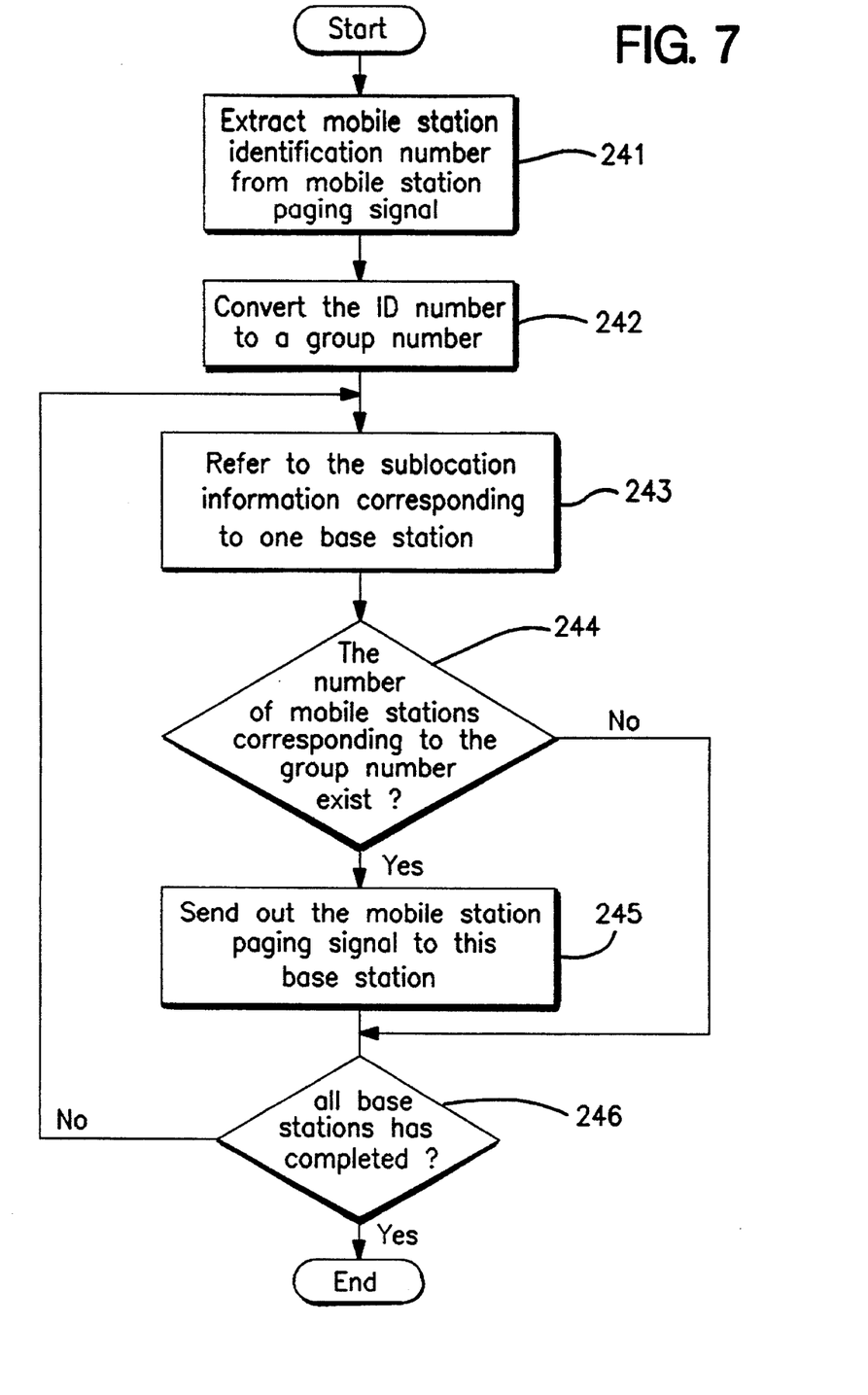
FIG. 7 is a flow chart illustrating the operation of the signal transfer node.

When the paging signal is transferred from the location register 31, the signal transfer node 21 identifies a base station area (or base station areas), in which the mobile station to be paged is expected, based on procedures shown by the flow chart of FIG. 7.

When there is an incoming call to a mobile station, the location register 31 determines with location information stored therein that the mobile station to be paged exists in a location area controlled by the signal transfer node 21, and then sends out a paging signal which includes a mobile station identification number to the signal transfer node 21. At this time, the signal transfer node 21 works as below to identify a base station area (or base station areas) in which a mobile station to be paged is expected to be present.

The mobile station paging signal transfer means 24 extracts a mobile station identification number contained in the paging signal sent from the location register 31, and transfers this mobile station identification number to the mobile station grouping means 23 (step 241). The mobile station grouping means 23 then converts this mobile station identification number to a group number as described above, and sends the group number back to the mobile station paging signal transfer means 24 (step 242). Next, the mobile station paging signal transfer means 24 refers to the sublocation information stored in the sublocation information storage means 22 (step 243). The mobile station paging signal transfer means 24 searches the sublocation information one by one for each base station with the index key of the group number obtained from the mobile station grouping means 23, and instructs the broadcasting operation of the paging signal to the base station if the sublocation information for the base station indicates at least one mobile station of a group number that coincides with the group number of the index key (steps 244 to 246).

Figure 8:
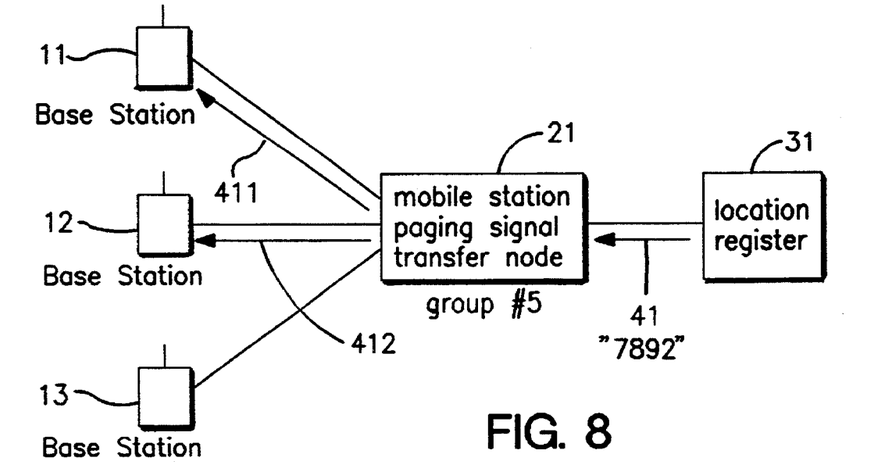
FIG. 8 is a schematic block diagram showing transfer of the paging signal in the embodiment of FIG. 2(a)

FIG. 8 is a block diagram showing an example of how the paging signal 41 is repeated and transferred through the signal transfer node 21 to base stations in which a mobile station to be paged is expected. In this example, it is assumed that the mobile station identification number is "7892" and the sublocation information as shown in FIG. 6 is stored.

The location register 31 sends a paging signal 41 including a mobile station identification number of "7892" to the signal transfer node 21. The mobile station identification number "7892" is extracted and calculated to obtain a group number. As the result of the calculation, the group number 5 is obtained, and the sublocation information is searched to identify each base station where a mobile station to be paged might be present. When the signal transfer node 21 searches the sublocation information for the base station 11 with the index key of the group number 5, a number of "2" is indicated. This means that there are two mobile stations of group number 5 in this base station area, and then, the paging signal 411 is transferred to the base station 11.

Similarly, the sublocation information for the base stations 12 and 13 are searched by the index key of the group number 5, and as a result, the signal transfer node 21 determines that a mobile station to be paged might be present in the base station 12 but not in the base station 13, and the paging signal is also transferred to the base station 12 as signal 412 but not transferred to the base station 13.

As described above, the present invention can distinguish only that base station area (or those base station areas) in which a mobile station to be paged might be present, and the paging signal is transferred to only the base station (or base stations) which covers the identified base station area (or base station areas).

Figure 9:
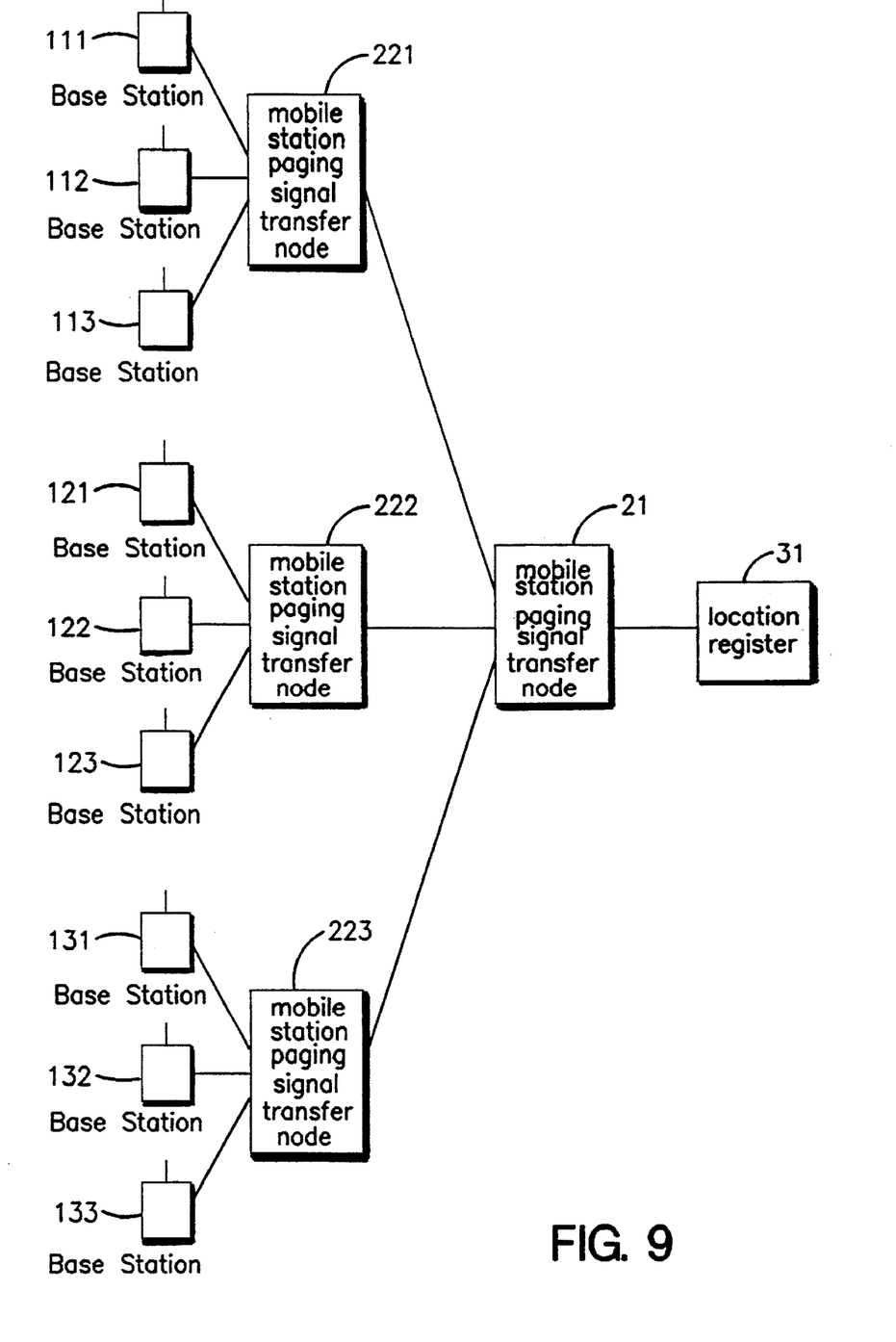
FIG. 9 is a schematic block diagram illustrating a mobile communication system according to a second embodiment of the invention.

FIG. 9 is a block diagram of a mobile communication system according to a second embodiment of the invention.

In this embodiment, a plurality of signal transfer nodes form a hierarchy, and signal transfer nodes 221, 222 and 223 (lower level) are connected to the signal transfer node 21 (upper level) which is in turn connected to the location register 31. Each signal transfer node 221, 222 and 223 controls the paging signal transfer to base stations 111 to 113, 121 to 123 and 131 to 133, respectively. The signal transfer node 21 of this embodiment does not differ from the signal transfer node 21 of the embodiment shown in FIGS. 2(a) and 2(b) in its structure, but it operates to determine whether the paging signal should be transferred to lower level signal transfer nodes 221, 222 and 223 instead of base stations. Each lower level signal transfer node 221, 222 and 223 has the same structure and function as the signal transfer node 21 shown in FIGS. 2(a) and 2(b).

Figure 10:
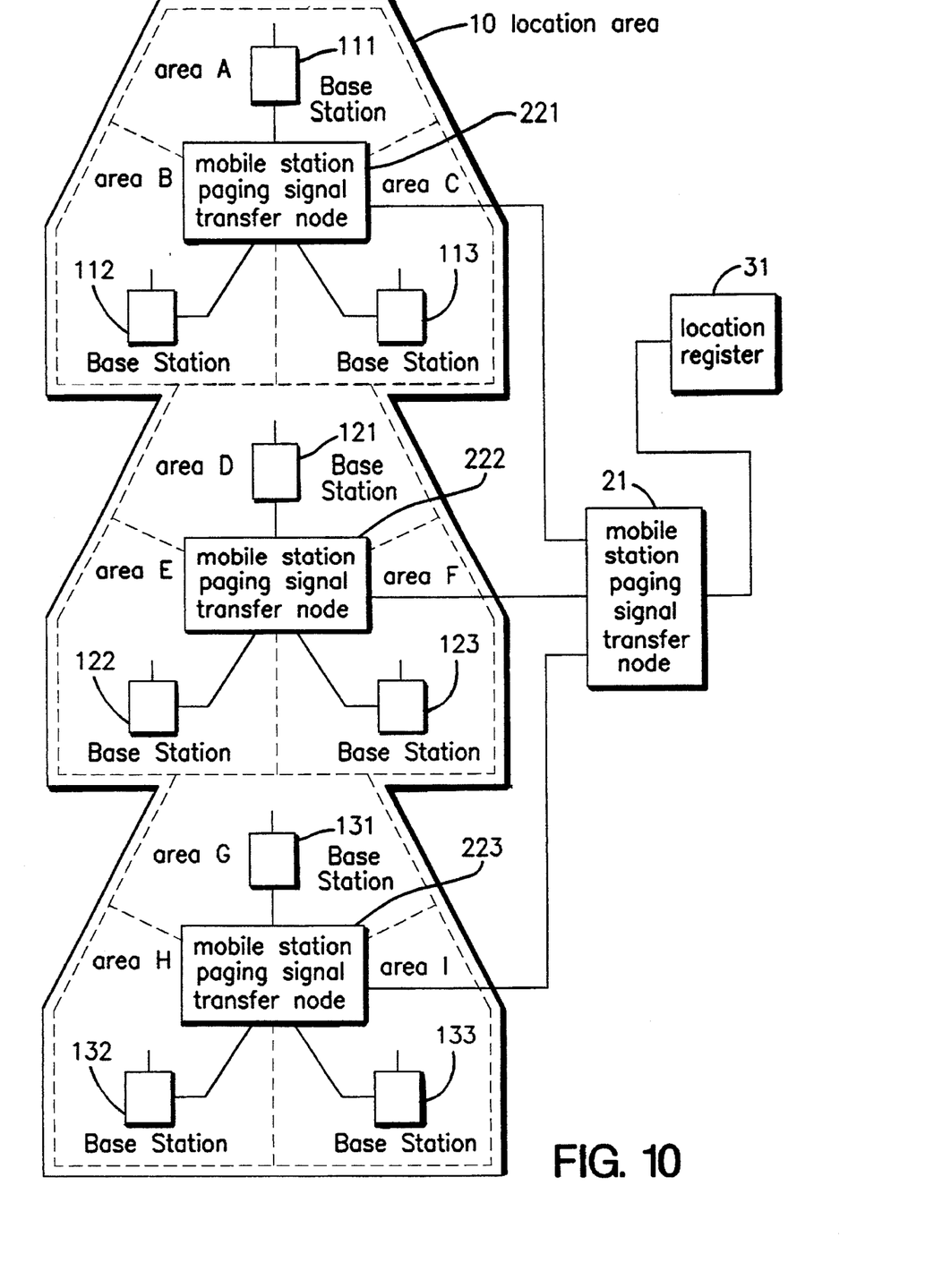
FIG. 10 is a schematic block diagram illustrating the embodiment of FIG. 9 grouped by areas.

FIG. 10 is a block diagram of the same mobile communication system shown in FIG. 9, but this figure shows the system from an area point of view. As shown in FIG. 10, this embodiment is applicable to a location area 10 which has many base station areas. The location area 10 consists of nine base station areas, area A to area I, and each area is covered by a respective one of base stations 111 to 133. Each signal transfer node 221, 222 or 223 controls three base stations.

Figure 11A:
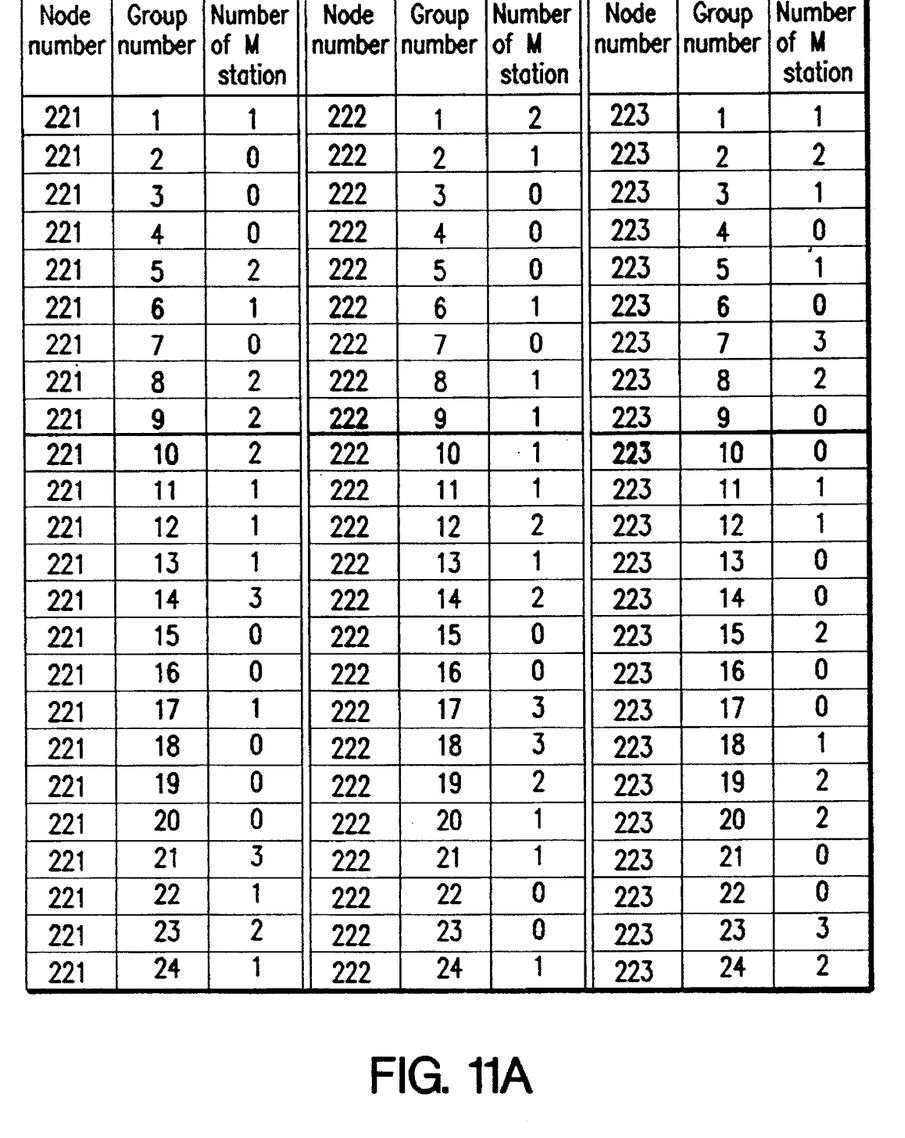
FIGS. 11A–11D are schematic diagrams showing an example of the sublocation information stored in the higher level signal transfer node and the lower level signal transfer node, respectively.
Figure 11B:
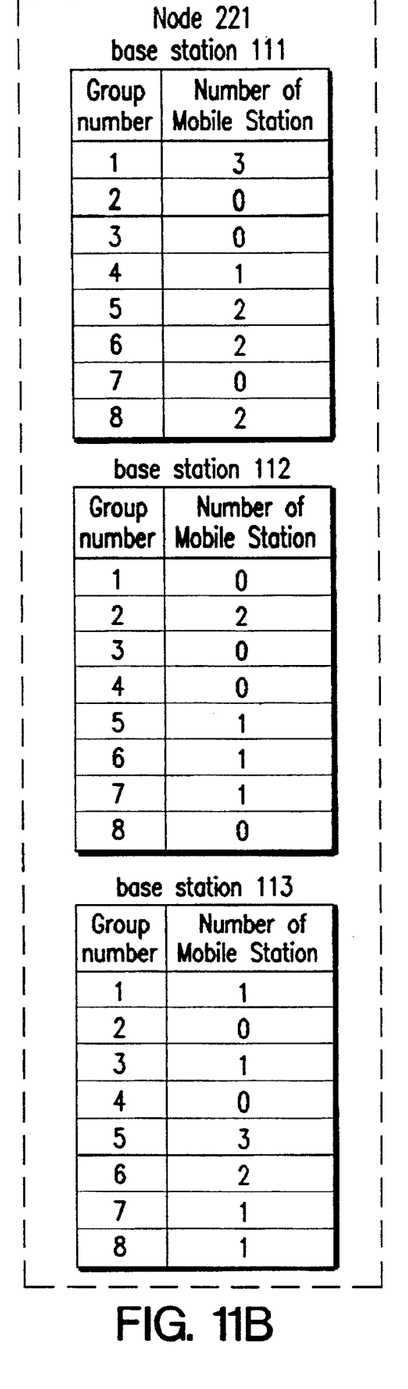
Figure 11C:
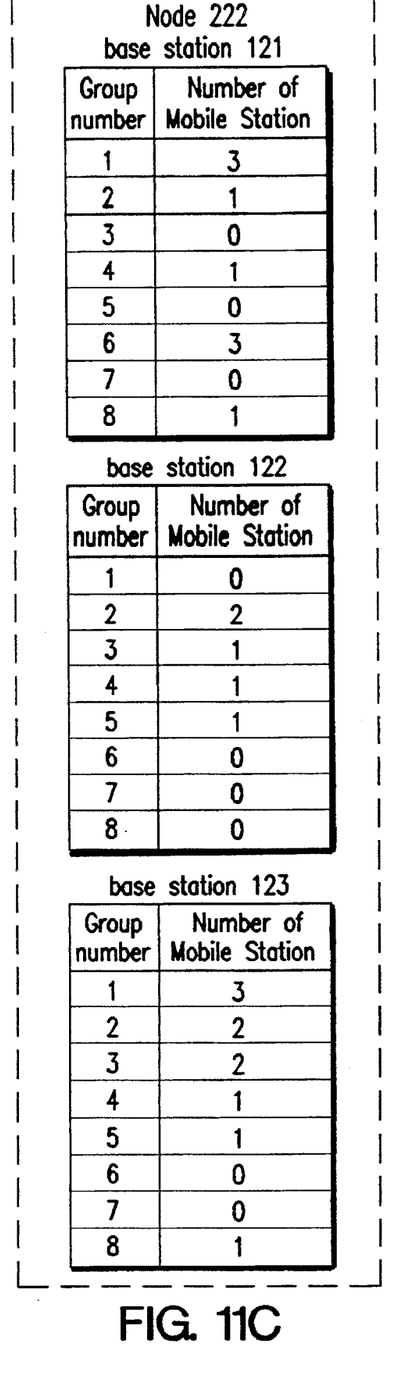
Figure 11D:
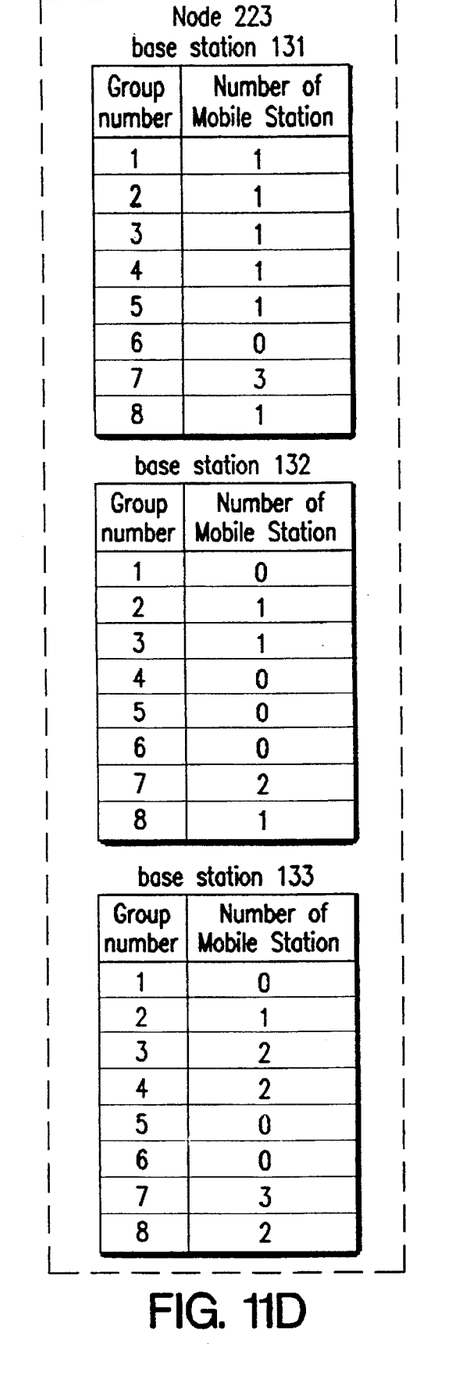

FIG. 11A shows an example of the sublocation information stored in the higher level signal transfer node 21 of the hierarchical embodiment of FIGS. 9 and 10. Each of the lower level signal transfer nodes 221, 222 and 223 has sublocation information similar to that shown in FIG. 6A for the base station areas under its control, and examples are shown in FIGS. 11B–11D. The higher level signal transfer node 21 should have sublocaction information as shown in FIG. 11A to identify that lower level signal transfer node (or nodes) to which the paging signal is to be sent, instead of identifying each base station.

Sublocation information stored in the higher level signal transfer node 21 consists of three sets of information each of which corresponds to information from a respective one of lower level signal transfer nodes 221, 222 and 223, and the information of each set is classified into 24 group numbers. These group numbers are converted from the mobile station identification number as previously described, except that the number 24 is used to perform the calculations instead of the number 8.

When a mobile station is moving and recognizes that it has entered a new area, it reports the location registration of the area through the new base station. This report is transferred to the lower level signal transfer node controlling that base station, and the report of location registration from the mobile station is analyzed.

If the location registration relates to a change of location area, i.e., entry into the location area 10, the lower level signal transfer node transfers this report of the location registration to the higher level signal transfer node. At the higher level signal transfer node, the location registration is also analyzed and recognized as a change of location area and the report of the location registration is transferred to the location register for updating location information. Also, the sublocation information in the lower level signal transfer node and higher level signal transfer node is updated at this time.

However, if the report of location registration is recognized as only a change of areas within the base station areas controlled by a given lower level signal transfer node, e.g.

a mobile station has moved from area A to area B in FIG. 10, the lower level signal transfer node 221 does not transfer the report of this information to the higher level signal transfer node 21 and only the sublocation information stored in the lower level signal transfer node 221 is updated.

When the report of location registration is recognized as a change of base station areas each of which is controlled by different lower level signal transfer node, e.g. a mobile station has moved from area B to area D in FIG. 10 and the report of the location registration is sent to the lower level signal transfer node 222 through the base station 121, the lower level signal transfer node 222 transfers the report of this information to the higher level signal transfer node 21 and sublocation information stored in the lower level signal transfer node 222 is updated. At the higher level signal transfer node 21, no report of this location registration is sent to the location register 31 because no change of location area has occurred, but the higher level signal transfer node 21 does update its own sublocation information and also instructs the lower level signal transfer node 221 previously communicating with the mobile station to update sublocation information stored in that lower level signal transfer node 221.

Figure 12:
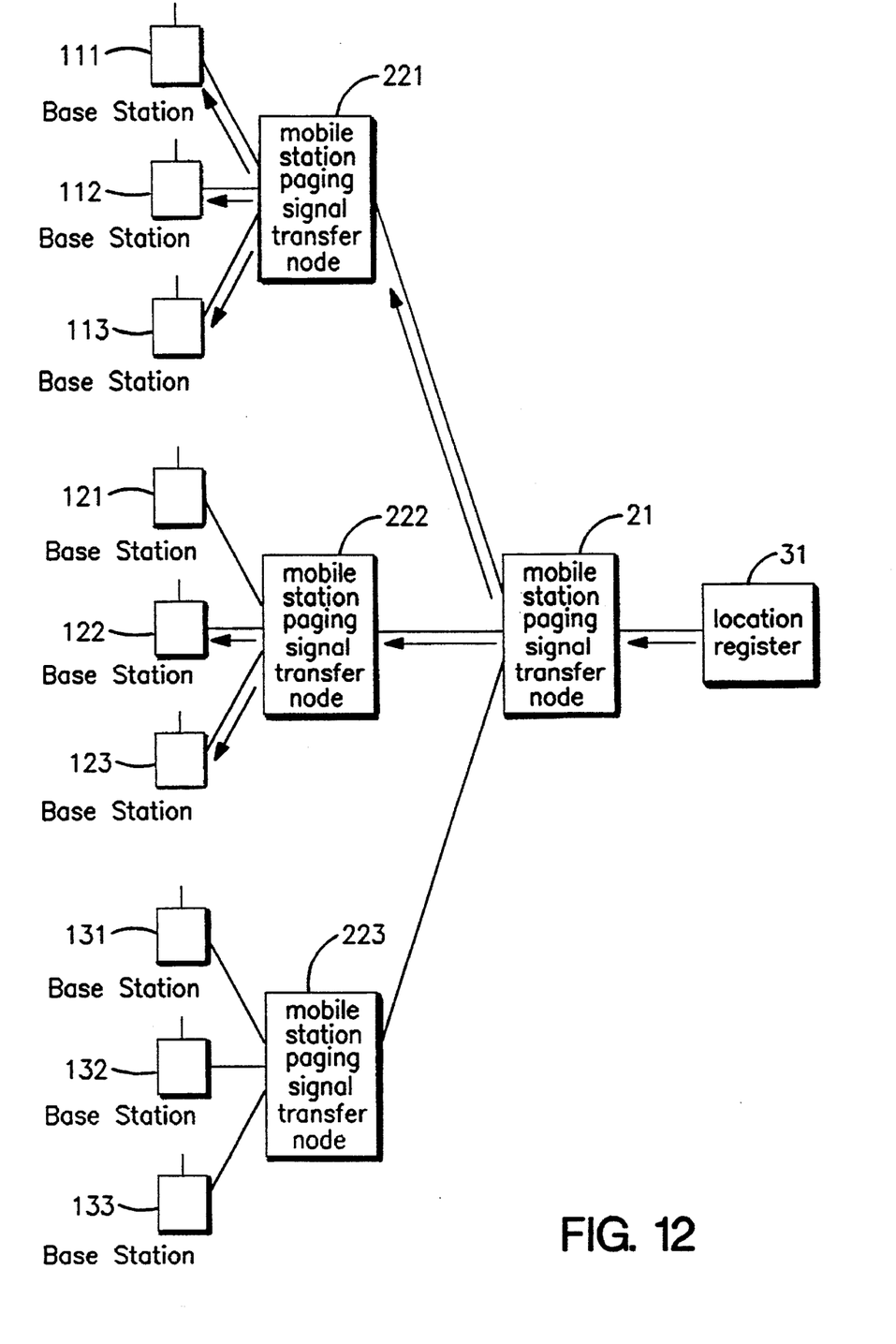
FIG. 12 is a schematic block diagram showing transfer of the paging signal in the embodiment of FIG. 9.

The paging signal in this embodiment is sent as follows:

FIG. 12 is a block diagram showing an example how the paging signal is repeated and transferred through the higher level signal transfer node 21 and the lower level signal transfer node 221, 222 or 223, and supplied to those base stations in which a mobile station to be paged might be present.

In this example, it is assumed that the mobile station identification number is "7892" and the sublocation information as shown in FIG. 11(a) is stored in the higher level signal transfer node 21 and each lower level signal transfer nodes stores the sublocation information as shown in FIG. 11(b).

The location register 31 sends a paging signal including a mobile station identification number of "7892" to the higher level signal transfer node 21. The mobile station identification number "7892" is extracted and converted to a group number. As the result of the conversion, the group number 21 is obtained (7892÷24=328.83; 328×24=7872; 7892−7872+1=21), and the sublocation information is searched to identify each lower level signal transfer node where a mobile station to be paged might be present in the base station areas communicating with that lower level signal transfer node.

When the higher level signal transfer node 21 searches the sublocation information for the lower level signal transfer node 221 with the index key of the group number 21, a numeral of "3" is indicated in the column corresponding to the group number 21. This means that there are candidate mobile stations present in the base station area (or base station areas) under the lower level signal transfer node 221, and the paging signal is therefore sent to the lower level signal transfer node 221.

Similarly, the sublocation information for the lower level signal transfer nodes 222 and 223 is searched by the index key of the group number 21, and as a result, the higher level signal transfer node 21 determines that the mobile station to be paged might be present in the lower level signal transfer node 222 but not in the lower level signal transfer node 223, and the paging signal is therefore also sent to the lower level signal transfer node 222 but not to the lower level signal transfer node 223.

Meanwhile, having received the paging signal from the higher level signal transfer node 21, the lower level signal transfer nodes 221 and 222 identify those base station areas in which the mobile station to be paged might be present by searching the sublocation information stored in each node.

In those lower level signal transfer nodes, the group number is classified into eight groups and the mobile station identification number "7892" is divided by "8" for converting to a group number. As the result of conversion, the group number "5" is obtained.

When the sublocation information in each lower level signal transfer node is searched with the index key of the group number "5", mobile stations of group number "5" are found in base stations 111, 112 and 113 for the lower level signal transfer node 221 and in base stations 122 and 123 for the lower level signal transfer 222.

Therefore, the paging signal is sent to base stations 111, 112 and 113 from the lower level signal transfer node 221, and also sent to base stations 122 and 123 from the lower level signal transfer node 222, but is not sent to those base stations such as 111 and 131 to 133 which do not have sublocation information which corresponds to the group number of the mobile station identification number to be paged.

According to this embodiment, even if the number of base stations increases in a location area, the process for transferring the paging signal from each signal transfer node is simplified. Although the case of a two-level hierarchy of signal transfer nodes is described in this embodiment, it is not limited to two, but may be any number.

As described, the present invention can identify only those base station areas in which a mobile station to be paged for an incoming call might be present, by using the sublocation information which shows number of mobile stations classified into groups, and the paging signal is selectively transferred to only those base station areas. The transmission capacity and signalling capacity in each of signal transfer nodes and base stations may be advantageously decreased.

Although the present invention has been fully described by way of various preferred embodiments thereof with reference to the accompanying drawings, number changes and modifications will be apparent to those having skill in this field. Therefore, unless these changes and modifications otherwise depart from the scope of the present invention, they should be construed as included therein.

I claim:

1. A mobile communication system comprising:

a plurality of base stations in a corresponding plurality of base station areas, said base stations communicating with a plurality of mobile stations and said base stations being identified by a location signal from each of said base stations;

a location register for supplying a paging signal for paging a mobile station at which an incoming call is to be received, said paging signal including mobile station identification number; and a mobile station paging signal transfer node interconnecting said base stations and said location register, comprising:

receiving means for receiving said paging signal supplied from said location register and for analyzing a mobile station identification number supplied therewith;

storage means for storing sublocation information indicating correspondences between a number of mobile stations existing in each base station area and a group number classified into predetermined groups based on said mobile station identification number;

identification means for identifying at least one base station in whose base station area a mobile station to be paged is expected to be present by searching said sublocation information for each base station area; and transferring means for transferring a paging signal to said at least one base station.

2. The mobile communication system according to claim 1, wherein said identification means comprises:

converting means for converting a mobile station identification number into a group number for updating said sublocation information.

3. The mobile communication system according to claim 2, wherein said identification means further comprises:

judging means for judging if a mobile station to be paged might be present in a base station area by finding at least one mobile station indicated in a group number of sublocation information which coincides with a group number obtained by said converting means.

4. A mobile communication system comprising:

a plurality of groups of base stations for communicating with a plurality of mobile stations in a corresponding plurality of base station areas which are identified by a location signal from each of said base stations;

a location register for supplying a paging signal for paging a mobile station at which an incoming call is to be received, said paging signal including a mobile station identification number;

a plurality of first mobile station paging signal transfer nodes, each node being connected to a corresponding one of said groups of base stations, and each first node comprising:

first receiving means for receiving a paging signal and for analyzing a mobile station identification number supplied therewith;

first storage means for storing a first sublocation information which indicates correspondences between a number of mobile stations present in each base station area of said corresponding group of base stations and a group number classified into a predetermined number of groups each of which is converted from said mobile station identification number;

first identification means for identifying at least one base station in whose area a mobile station to be paged is expected to be present by searching said first sublocation information for each base station area; and first transferring means for transferring a paging signal to said at least one base station; and a second mobile station paging signal transfer node connected between said plurality of first mobile station paging signal transfer nodes and said location register, comprising:

second receiving means for receiving a paging signal supplied from said location register and for analyzing a mobile station identification number supplied therewith;

second storage means for storing a second sublocation information which indicates correspondences between at least one mobile station existing in at least one of said first mobile station paging signal transfer nodes and a group number classified into predetermined number of groups each of which is converted from a mobile station identification number;

second identification means for identifying at least one of said first mobile station paging signal transfer nodes under which a mobile station to be paged is expected to be present by searching said second sublocation information for each first mobile station paging signal transfer node; and second transferring means for transferring a paging signal from said location register to at least one of said first mobile station paging signal transfer nodes identified by said second identification means.

5. The mobile communication system according to claim 4, further comprising:

a plurality of third mobile station paging signal transfer nodes which form a hierarchical level between said first mobile station paging signal transfer nodes and said second mobile station paging signal transfer node, each said third mobile station paging signal transfer nodes comprising:

a third receiving means for receiving a paging signal supplied from a mobile station paging signal transfer node belonging in a next higher level and for analyzing a mobile station identification number supplied therewith;

third storage means for storing third sublocation information which indicates correspondences between a number of mobile stations existing in at least one next lower level mobile station paging signal transfer node and a group number classified into predetermined number of groups each of which is converted from a mobile station identification number;

a third identification means for identifying at least one mobile station paging signal transfer node in a next lower level, through which is connected a base station in which a mobile station to be paged might be present, by searching said third sublocation information for each mobile station paging signal transfer node of said next lower level; and third transferring means for transferring a paging signal from said higher level mobile station paging signal transfer node to at least one of said next lower level mobile station paging signal transfer nodes identified by said third identification means.

6. A mobile station paging method in a mobile communication system, said system including a plurality of base stations for communicating with a plurality of mobile stations in a corresponding plurality of base station areas which are identified by a location signal from each of said base stations, a location register for supplying a paging signal for paging a mobile station at which an incoming call is to be received, said paging signal including a mobile station identification number, and a mobile station paging signal transfer node interconnecting said base stations and said location register, said node containing sublocation information which indicates correspondences between at least one mobile station existing in each base station area and a group number classified into predetermined number of groups based on a mobile station identification number; said mobile station paging method comprising the steps of:

receiving a paging signal supplied from said location register and analyzing a mobile station identification number supplied therewith;

converting said mobile station identification number into a group number;

searching said sublocation information for each base station having said group number;

judging whether a mobile station to be paged might be present in a base station area by finding at least one mobile station having a group number in said sublocation information which coincides with said group number;

identifying at least one base station in which a mobile station to be paged might be present as a result of said judging; and transferring a paging signal to said at least one identified base station.

* * * * *